United States Patent
Harris

(10) Patent No.: US 10,191,551 B2
(45) Date of Patent: Jan. 29, 2019

(54) TOUCH SENSITIVE DEVICE

(71) Applicant: NVF Tech Ltd., Cambridgeshire (GB)

(72) Inventor: Neil John Harris, Cambridgeshire (GB)

(73) Assignee: NVF Tech Ltd, Cambridgeshire (GB)

( * ) Notice: Subject to any disclaimer, the term of this patent is extended or adjusted under 35 U.S.C. 154(b) by 0 days.

(21) Appl. No.: 15/861,942

(22) Filed: Jan. 4, 2018

(65) Prior Publication Data

US 2018/0129289 A1 May 10, 2018

Related U.S. Application Data

(63) Continuation of application No. 12/921,977, filed as application No. PCT/JP2009/064366 on Aug. 7, 2009.

(30) Foreign Application Priority Data

Aug. 8, 2008 (GB) .................................. 0814506.2

(51) Int. Cl.
*G06F 3/01* (2006.01)
*G06F 3/043* (2006.01)
(Continued)

(52) U.S. Cl.
CPC .............. *G06F 3/016* (2013.01); *G06F 3/038* (2013.01); *G06F 3/041* (2013.01); *G06F 3/0436* (2013.01); *G06F 3/04883* (2013.01)

(58) Field of Classification Search
CPC .......... G06F 3/041; G06F 3/016; G06F 3/038; G06F 3/04883; G06F 3/043; G06F 3/0433; G06F 3/06
See application file for complete search history.

(56) References Cited

U.S. PATENT DOCUMENTS 4,885,565 A 12/1989 Embach
4,980,518 A 12/1990 Kobayashi et al.
(Continued)

FOREIGN PATENT DOCUMENTS

CN 1195461 10/1998
CN 1529840 9/2004
(Continued)

OTHER PUBLICATIONS

Christian Mller-Tomfelde et al. "Modeling and Sonifying Pen Strokes on Surfaces," IPSI, Proceedings of the Cost G-6 Conference on Digital Audio Effects, Limerick, Ireland, Dec. 2001, 5 pages.
(Continued)

*Primary Examiner* — Sanjiv D Patel
(74) *Attorney, Agent, or Firm* — Fish & Richardson P.C.

(57) ABSTRACT

An apparatus including a touch sensitive screen having a face adapted to receive a user's hand-writing via a hand-held stylus. The screen includes means exciting the screen to vibrate so as to transmit the vibration to the stylus to simulate the sensation of a writing implement writing on paper as the stylus is moved over the face of the screen. The apparatus may include means for period modulating the electrical signal applied to the exciting means and means for amplitude modulating the electrical signal. The apparatus may include means for sensing the velocity of movement of the stylus over the screen face and means for modulating the vibration according to the sensed velocity.

16 Claims, 10 Drawing Sheets

(51) Int. Cl.
  *G06F 3/041* (2006.01)
  *G06F 3/038* (2013.01)
  *G06F 3/0488* (2013.01)

(56) References Cited

U.S. PATENT DOCUMENTS

| | | |
|---|---|---|
| 5,627,348 A | 5/1997 | Berkson et al. |
| 5,638,060 A | 6/1997 | Kataoka et al. |
| 5,977,867 A | 11/1999 | Blouin |
| 6,429,846 B2 | 8/2002 | Rosenberg |
| 7,119,796 B2 | 10/2006 | Van Dam et al. |
| 7,369,115 B2 | 5/2008 | Cruz-Hernandez |
| 8,228,299 B1 | 7/2012 | Maloney et al. |
| 2001/0006006 A1 | 7/2001 | Hill |
| 2002/0075135 A1 | 6/2002 | Bown |
| 2002/0190963 A1 | 12/2002 | Van Dam et al. |
| 2003/0067450 A1 | 4/2003 | Thursfield |
| 2005/0030284 A1 | 2/2005 | Braun |
| 2006/0044287 A1 | 3/2006 | Ake |
| 2006/0158440 A1 | 7/2006 | Ashenbrenner |
| 2006/0187215 A1 | 8/2006 | Rosenberg et al. |
| 2007/0080951 A1 | 4/2007 | Maruyama |
| 2007/0236450 A1 | 10/2007 | Colgate et al. |
| 2008/0204266 A1 | 8/2008 | Malmberg |
| 2009/0079703 A1 | 3/2009 | Kyung |
| 2009/0135164 A1 | 5/2009 | Kyung et al. |
| 2010/0013613 A1 | 1/2010 | Weston |
| 2010/0090815 A1 | 4/2010 | Yamaya |

FOREIGN PATENT DOCUMENTS

| | | |
|---|---|---|
| CN | 1921667 | 2/2007 |
| CN | 1996217 | 7/2007 |
| CN | 101071357 | 11/2007 |
| EP | 0556999 | 8/1993 |
| EP | 1310860 | 5/2003 |
| EP | 1752860 | 2/2007 |
| EP | 2101246 | 9/2009 |
| EP | 2101247 | 9/2009 |
| JP | H1185400 | 3/1999 |
| JP | 11512245 | 10/1999 |
| JP | 2003300015 | 10/2003 |
| JP | 2008146560 | 6/2008 |
| WO | WO 199200559 | 1/1992 |
| WO | WO 199709842 | 3/1997 |
| WO | WO 199709853 | 3/1997 |
| WO | WO 200148684 | 7/2001 |
| WO | WO 200154450 | 7/2001 |
| WO | WO 2003005292 | 1/2003 |
| WO | WO 2004053781 | 6/2004 |
| WO | WO 2008078523 | 7/2008 |

OTHER PUBLICATIONS

Examination Report for Application No. GB0814506.2 dated Dec. 12, 2011, 3 pages.
International Search Report for Application No. 2009801102828, 2 pages.
Abramowitz et al. "Handbook of Mathematical Functions with Formulas, Graphs and Mathematical Tables," National Bureau of Standards Applied Mathematics Series 55, Dec. 1972, 5 pages.

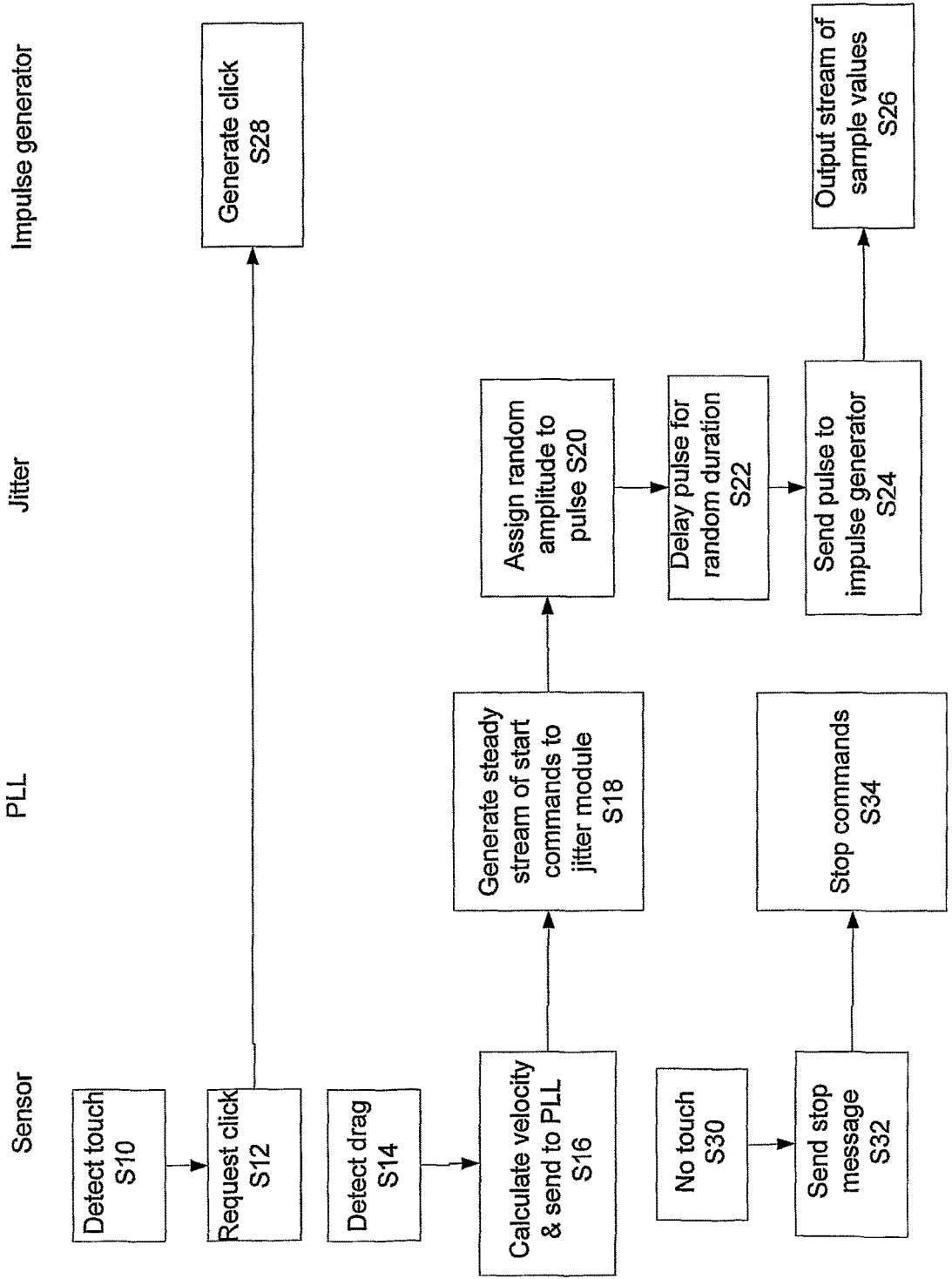

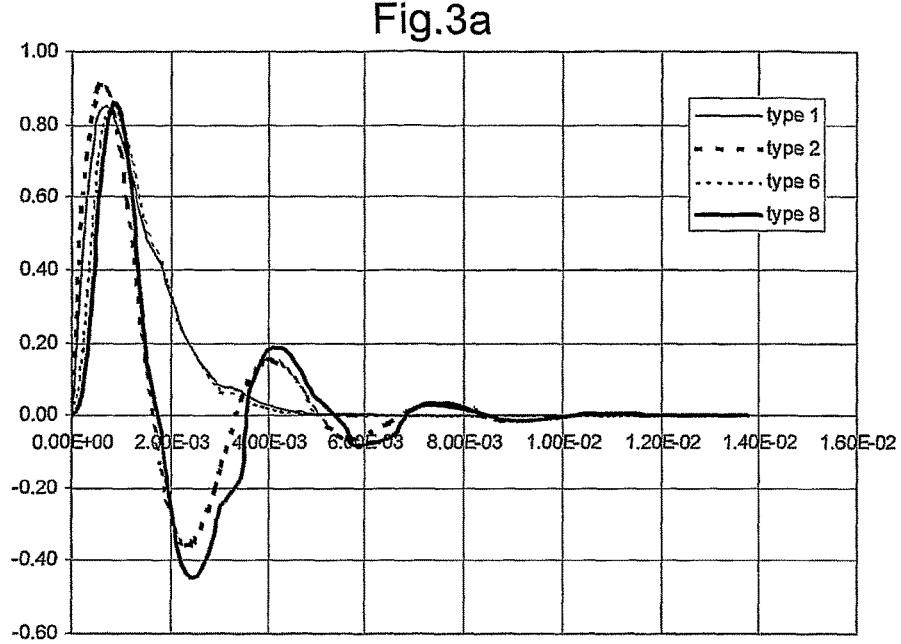
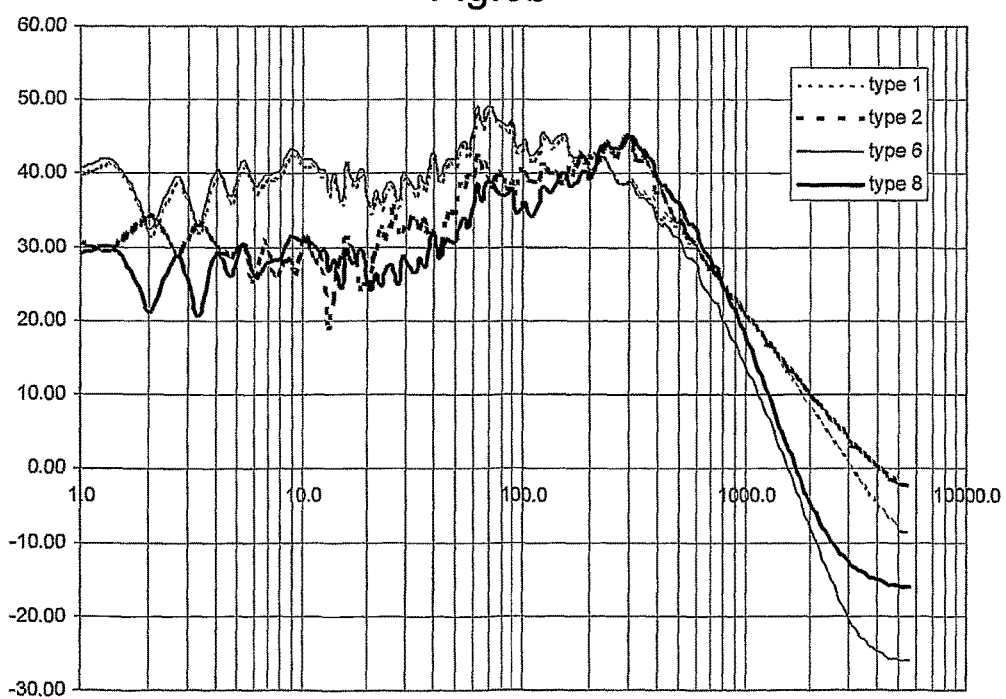

Fig.4
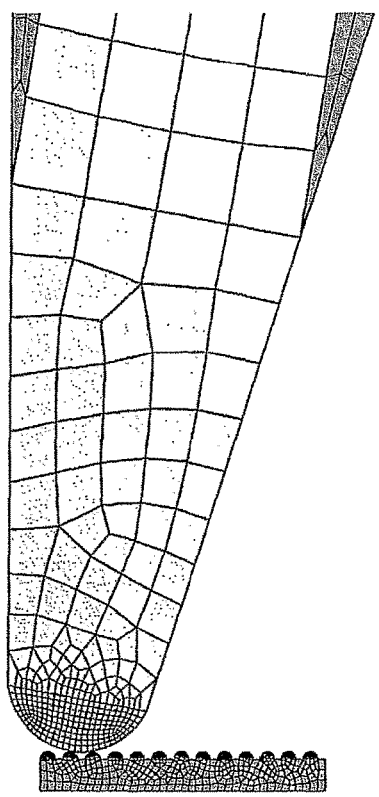
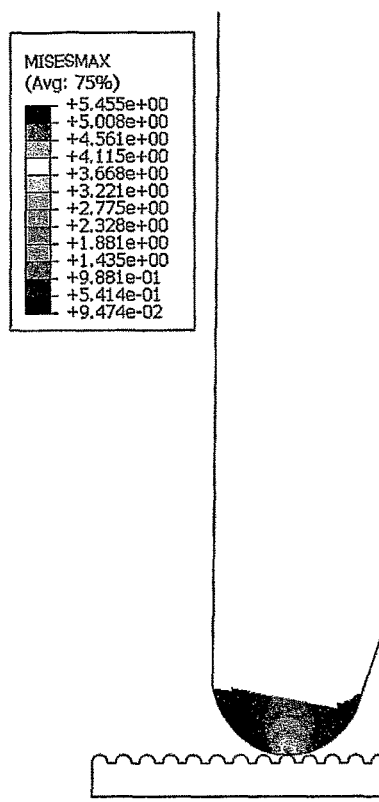

TOUCH SENSITIVE DEVICE

This application is a continuation of and claims priority to U.S. patent application Ser. No. 12/921,977, filed on Dec. 13, 2010, which is a 371 U.S. National Phase of and claims priority to PCT/JP2009/064366, filed on Aug. 7, 2009, which claims priority to United Kingdom Application 814506.2, filed on Aug. 8, 2008, all incorporated herein by reference.

BACKGROUND OF THE INVENTION

Field of the Invention

The invention relates to touch sensitive devices including touch sensitive screens or panels, in particular panels for use with a stylus or other writing instrument.

Description of Related Art

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which form a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

In each of the prior art documents described above, tactile feedback is provided in response to a discrete touch, of a user's finger or pointer. However, it is recognised by the applicant that tactile feedback may also be useful for continuous movements across the touch screen.

SUMMARY OF THE INVENTION

According to the invention, there is provided a method of simulating the sensation of a writing implement writing on paper when using a hand-held stylus to write on a touch-sensitive screen, comprising arranging the screen to vibrate when contacted by the stylus to provide user feed-back.

Paper comprises a fibre mat in a binder with individual fibres having a random orientation resulting in a rough surface having local variations in the coefficient of friction (sliding or static) on the level traced by the small contact patch between the tip of a pencil and the paper surface. The motion of a pencil over the surface may be described as stick-slip style motion. A similar effect is felt when writing with other writing instruments, such fibre tip pen. For other types of writing instruments, variations on the effect may be felt. For example for a fountain pen this may be scratchy if a bad nib but have a smoothish, water lubricated glide if good. The type of paper also has an effect and often fountain pen users are selective about finding paper with the right nib feel and which takes ink at the right rate without bleeding. For biros, there is a viscous smooth friction sliding but the paper does have some underlying fibrous texture.

In contrast, when writing with a stylus or pointer on a polymer or glass cover of a touch sensitive panel or surface, this slip-stick motion is lost. The slip stick behaviour of pencil on paper is a key element of the writing sensation. Writing to touch sensitive screens with a stylus has improved sensation, appeal and user satisfaction when there is a simulation of the pencil on paper writing characteristic.

The screen may be vibrated by applying a signal comprising multiple pulses or a stream of pulses.

The method may comprise sensing the velocity of movement of the stylus over the screen face, for example, by using a sensor. The screen may be arranged to vibrate according to the sensed velocity. Thus for a signal having multiple pulses, the signal may have a mean pulse rate comparable to that of the sensed velocity.

The method may comprise arranging for the vibration to simulate the drag of writing implement moving over paper by period modulating the vibration, for example for a signal having multiple pulses by changing the spacing in time between pulses, i.e. by changing the pulse rate. The spacing may be randomised whereby the random spacing of the paper fibres is simulated. The spacing of the pulses may in the range of $\frac{1}{5}$ to $\frac{4}{5}$ of twice the mean inter-fibre spacing.

The vibration may simulate the axial reciprocating movement of writing implement moving over paper by amplitude modulating the vibration. The amplitude may be randomised whereby the random height of the paper fibres is simulated. The amplitude may be defined by the scale factor which is the tactile equivalent of the volume control in audio. The scale factor may adjusted by the user to give a suitable level of stimulation. The amplitude may be in the range of $\frac{3}{8}$ to $\frac{7}{8}$ of the scale factor.

Two connected random sequences may thus be applied to generate the vibration, a first sequence to account for inter-fibre spacing and a second to account for the height of the fibres. Together the random sequences may simulate a synthetic paper structure for the touch screen.

A pencil writing on paper may also have its own resonances which contribute to the feel of the writing sensation. Accordingly, the stylus may be configured so that it is excited into beam resonance in response to vibration of the screen whereby the vibration simulates resonance of writing implement moving over paper.

The screen may be excited to produce a sound effect simulating that of writing implement writing on paper.

The vibration may include any type of vibration, including bending wave vibration, more specifically resonant bending wave vibration.

According to another aspect of the invention, there is provided apparatus comprising a touch sensitive screen having a face adapted to receive and record a user's handwriting via a hand-held stylus, wherein the screen comprises a vibration exciter exciting the screen to vibrate so as to transmit the vibration to the stylus to simulate the sensation of a writing implement writing on paper as the stylus is moved over the face of the screen.

The vibration exciter may comprise means for applying a bending wave vibration to the screen face. The vibration exciter may be electro-mechanical and may comprise signal generating means for applying an electrical signal to the vibration exciter to cause the exciter to vibrate the screen.

The signal generating means may comprise means generating a signal comprising multiple pulses, e.g. phase locked loop module generating a stream of pulses having a mean pulse rate. The apparatus may comprise means for sensing the velocity of movement of the stylus over the screen face. The means for modulating the vibration may be configured to modulate the vibration according to the sensed velocity, for example, the means generating the pulsed signed may be configured to adjust the mean pulse rate to match the sensed velocity.

The apparatus may comprise means for period modulating and/or means for amplitude modulating the electrical signal. The period and/or amplitude modulation may be random and may be applied by a jitter module.

The signal generating means may generate a signal to cause the screen to radiate an acoustic component simulating that of a writing implement writing on paper, the acoustic signal being modulated by the velocity sensing means.

The signal generating means may further comprise a filter to reduce high-frequency content. In this way, a realistic feel may be provided with as little noise as possible.

The vibration exciter may be a moving coil transducer or a piezoelectric bending transducer, for example one comprising a resonant element as described e.g. in WO01/54450, incorporated herein by reference. The exciter may be inertial The touch screen may be a panel-form member which is a bending wave device, for example, a resonant bending wave device. The touch screen may also be a loudspeaker wherein a second vibration exciter excites vibration which produces an acoustic output. For example, the touch screen may be a resonant bending wave mode loudspeaker as described in International Patent Application WO97/09842 which is incorporated by reference.

Contact by the stylus on the screen may be detected and/or tracked as described in International patent applications WO 01/48684, WO 03/005292 and/or WO 04/053781 to the present applicant. These International patent applications are hereincorporated by reference. Alternatively, other known methods may be used to receive and record or sense such contacts.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings in which:—

FIG. 1b is a block diagram of the system for use with the touch sensitive screen of FIG. 1a;

FIG. 2 is a flow chart showing the interaction of the various components in the system of FIG. 1b;

FIG. 3a shows the impulse responses of four signals which may be generated by the system of FIG. 1b;

FIG. 3b shows the smoothed frequency spectra of the signals of FIG. 3a;

FIG. 4 shows a 2-D model of pencil on paper;

FIG. 6b is a smoothed version of the sampling spectrum for the structure of FIG. 6a;

FIG. 9a plots the scaled variation in amplitude over time for four types of signals, and FIG. 9b plots the frequency spectra of the generated randomised tactile signals corresponding to each of the impulse signals of FIG. 9a.

DETAILED DESCRIPTION OF THE INVENTION

Figure 1A:
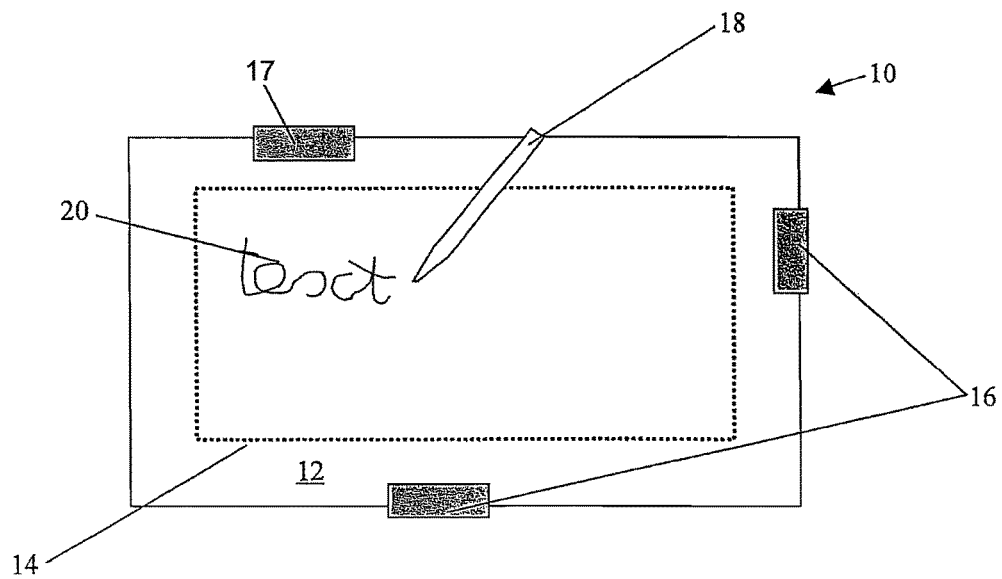
FIG. 1a is a plan view of a touch sensitive screen.

FIG. 1a shows a touch sensitive device 10 comprising a touch sensitive screen 12 on which a stylus 18 or pencil or similar writing instrument is being used to write text 20. One or more sensors 16 are used to detect a touch or movement of the stylus on the screen and an exciter 17 is provided to generate a signal within the screen. The slip stick behaviour of pencil on paper is a key element of the writing sensation. Writing to touch sensitive surfaces with a stylus has improved sensation, appeal and user satisfaction when there is simulation of the pencil on paper writing characteristic.

Figure 1B:
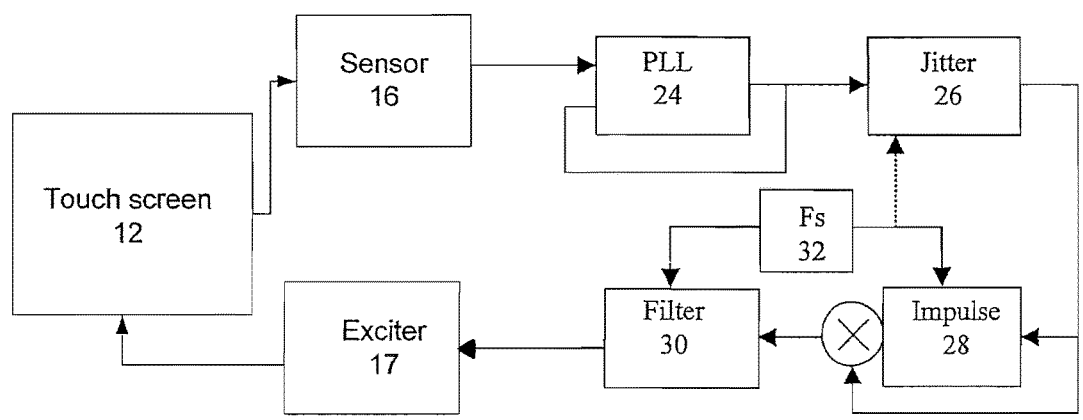

FIG. 1b shows how the touch sensitive device 10 may be adapted to use haptic methods and mechanical feedback technology to create such a simulation. The writing surface is mechanically energised under the pre-programmed control of the writing input from the stylus to simulate the feel of pencil on paper. As explained in more detail below, a model including the inherent mechanical behaviour of a pencil may be incorporated into the system but this would not be recognised or understood by a user who simply feels the result of the simulation.

As shown in FIG. 1b, the touch sensitive screen 12 is connected to a sensor 16 which detects the nature of the contact from the stylus. The sensor is connected to PLL (phase locked loop) 24 which is one of the key elements used to generate the algorithm to generate the desired sensation of pencil on paper. The elements of the algorithm may be implemented in hardware or software. The individual elements have the following description:

| Element | Short description | Function |
| --- | --- | --- |
| PLL module 24 | Phase-Locked Loop | Provides a stream of pulses having a mean impulse rate locked to the speed of writing as determined by software from the touch screen. |
| Jitter module 26 | Pulse randomiser | Randomly modifies the regular pulses into pulses of varying amplitude and separation according to statistical rules |
| Fs 32 | Audio sample rate | Generates clock for audio samples (texture) |

| Element | Short description | Function |
|---|---|---|
| Impulse generator 28 | FIR filter | Impulse response that is triggered by the jittered pulses |
| Filter 30 | Optional post-filter | Reduces high-frequency content to make quieter |

The PLL and Jitter blocks 24,26 run at the relatively slow rate set by the resulting pulse train. This should be below 150 Hz average rate, but the resolution of the jitter should be closer to the audio rate. The audio rate, Fs, is set as appropriate for the signal bandwidth required, but will almost certainly be no more than 11025 Hz (i.e. ¼ of the standard CD audio rate). Where multiple audio channels are used, these signals may be multiplexed in a single channel. Thus where four audio channels are used, and instead of having four channels at 11025 Hz, it would be possible to have one audio channel of 44100 Hz, which would be time-domain multiplexed (TDM) into four haptic channels. The output from the filter 30 is sent to an exciter 17 which generates the signal in the screen to simulate the desired feel.

FIG. 2 is a flow chart showing the steps implemented by each block in the system. The sensor, which may be implemented as software on the touch sensitive device, is monitoring the touch sensitive screen. When a "touch" is detected as at step S10, it requests a "haptic click" (step S12) from the signal generator or impulse generator 28 and the impulse generator generates a pulse which provides a "click" sensation at step S28. Screen surfaces are generally softish and quite well damped. Thus the stylus impact is rather quiet. The "click" may or may not provide an audible feedback depending on the proposed use for the touch screen. When a "drag" is detected as at step S14, the sensor monitors the changes in position and calculates the drag rate, or velocity as at step S16. This velocity data is then fed to the PLL module 24 which produces a stream of pulses. When the stylus lifts, the sensor detects no touch as at step S30 and sends instructions to the PLL to stop (step S32). At step S34, the PLL stops generating any commands.

The pulses used for the haptic click sensation may be the same as the pulses which form the basis of the writing simulation but are not necessarily the same. For example, in the suggested implementation below, they are different. The spectra of the different signals are all chosen to match the sensitivity of the finger-tips to vibration.

The function of the PLL module 24 is described as follows. At step S18, on receipt of velocity information from the sensor, the PLL module provides a steady stream of pulses which act as start commands to the Jitter module (step S20). The PLL module measures the mean error between the rate of this stream (the actual rate) and the incoming velocity estimates (the target rate) and adjusts the actual rate to match the target. The PLL module should provide memory and some filtering, so that in the presence of noisy or missing estimates there is still a regular output. In summary, Inputs: Start/Stop, Velocity (target rate)
Outputs: Pulses at target rate
Function: Measure mean error between target and actual rates, and adjust appropriately.
Notes: Target pulse frequency=drag velocity/inter-fibre spacing The function of the Jitter module 26, which provides the synthetic paper structure to the texture, is described as follows. At step S20, the Jitter module 26 assigns a random amplitude to the pulse, and then at step S22, delays the pulse for a random duration before passing it on to the signal or impulse generator 28 at step S24. The statistics of the amplitude distribution are unconstrained by the pulse rate, but the average delay should be ½ the inter-pulse spacing, which means that some knowledge of the pulse rate is required. In summary, Inputs: Synchronisation (start), mean rate
Output: Amplitude, delayed synch
Function: Effectively, a programmable mono-stable with additional output The Beta distribution may be used for the random signals. This sets the correct mean and variance for both jitter and amplitude data. The values chosen "by inspection" seem close to optimal—other values tested produce less realistic sensations. Generating Beta statistics by software or hardware may be difficult, so pragmatically it is suggested to use a simple uniform distribution (i.e. rectangular distribution) of the same mean and variance. The rectangular distribution is by far the simplest to generate and is as good as, or almost as good as the most complicated version The standard way of generating a uniform distribution of samples by software or hardware is the PRBS, or pseudo-random bit sequence. This is produced by a shift-register with feed-back occurring on certain bit patterns, or masks. The choice of mask affects the repeat length of the sequence and the "whiteness" of the noise.

A standard method for generating a specified statistical distribution from the uniform distribution is the so-called "Inverse transform sampling" method (see. It maps noise samples from a uniform distribution on (0, 1] into samples having the specified statistical distribution. For this method, it is necessary to know the inverse of the cumulative density function. A simple example follows;

Assume a target uniform distribution on (a, b]; the probability density function (PDF) is $$PDF(x) = \begin{cases} 1/(b-a) & \text{if } a < x <= b; \\ 0 & \text{otherwise} \end{cases}$$

The cumulative density function (CDF) is obtained by integrating the PDF. The inverse CDF is a function that inverts the CDF, i.e. $CDF^{-1}(CDF(x))=x$. From the PDF, it is also possible to calculate the mean and standard deviation. Fixing any two different statistical properties allows a and b to be determined.

Unfortunately, the inverse CDF in closed form is not known for the Beta distribution, hence this method does not help. However, we may look at similar distributions which do have a known inverse CDF, and use these instead. The simplest approximation is the triangular distribution, so called because its PDF is in the shape of a triangle. In its most general form, it is controlled by three variables; a, b and c. In a simplified form, a=0, b=1 and 0<=c<=1 and $$PDF(x) = \begin{cases} 2\frac{x-a}{(b-a)(c-a)} & \text{if } a < x <= c; \\ 2\frac{b-x}{(b-a)(b-c)} & \text{if } c < x <= b; \\ 0 & \text{otherwise} \end{cases}$$

The closest approximation to the Beta distribution is the Kumaraswamy distribution. It is controlled by two variables, a and b (real and positive), and is bound on [0,1] with $$PDF(x) = \begin{cases} abx^{a-1}(1-x^a)^{b-1} & \text{if } 0 < x <= 1; \\ 0 & \text{otherwise} \end{cases}$$

Each of the three distributions highlighted above may be used to generate randomness to simulate texture. Each sample requires two sets of random data—the spacing and the amplitude. In principle, these two sets could be completely independent, but testing suggests that they should be generated from the same uniform distribution. (This does make some sense, as a long gap will be associated with a large amplitude and a small gap with a small amplitude, thus making the signal energy more uniform).

| Distribution | Parameters for spacing | Parameters for amplitude |
| --- | --- | --- |
| Kumaraswamy | a = 3, b = 5 | a = 5, b = 3 |
| Triangular [0, 1] | a = 0, b = 1, c = 0.5 | a = 0, b = 1, c = 0.75 |
| Rectangular | a = 0.207, b = 0.793 | a = 0.375, b = 0.875 |

Plotting the PDF together with the spectra for each distribution suggests that the "odd man out" is the triangular distribution. The main differences are in the 1-5 Hz range, and to a lesser extent at the 50 Hz mean repetition rate. Allowing the triangular distribution to cover the full range is not best. The rectangular distribution is as good as, or almost as good as the most complicated version (Kumaraswamy) and thus is the most logical choice since it is by far the simplest to generate.

The function of the impulse generator 28, which provides spectral properties of the texture, is described as follows. On receipt of a signal from the jitter module 26, the impulse generator 28 outputs a signal in the form of a stream of sample values (step S26). If another input is received before the stream is complete, then a new stream begins. The amplitude of the output signal is modified according to data received from the jitter module 26. In summary, Inputs: Synchronisation (start), amplitude
Output: Sequence of haptic "audio" samples
Function: Filter the pulse train into an analogue signal This function may be selected from a number of mathematical models and fed appropriate (adjustable) parameters. Using these functions, arbitrary non-integer roll-off rates are possible as explained below. The impulse generator comprises a FIR (finite impulse response) filter to match the haptic signal output from the impulse generator 28 to the sensitivity of the fingers to touch. The filter may reduce the high-frequency content to a reasonable level.

The optional filter 30 may be provided to reduce any remaining high-frequency breakthrough from the impulse generator. It is envisaged that this will be a very simple recursive, $1^{st}$ order stage filter with coefficients chosen to avoid multiplication; e.g. $2^{\wedge}(-n)$, $1-2^{\wedge}(-n)$. If this proves insufficient, a $2^{nd}$ order filter could be used instead. The cut-off frequency would be around, say, 500 Hz-600 Hz.

FIG. 3a shows the impulse responses of four signals from the impulse generator incorporating a filter, each with a cut-off at or near 300 Hz. Filters universally have integer order roll-off; for example the R-C network of electronics has a first-order response, while the L-C-R network may have a second-order response. An n-th order roll-off on a bode-plot is represented by a slope of 6×n dB per octave or 20×n dB per decade.

Many natural phenomena have "fractal" characteristics—that is, their dimensionality is non-integer. A simple and well known example is "1/f noise" which has a ½ order roll-off, or a 3 dB per octave slope. In order to produce a signal with the right "feel" and "sound", it was found useful to have the ability to assign a fully variable roll-off to the signal. That is, its level falls as frequency$^{\wedge}$p or its power as frequency$^{\wedge}$2p.

It is known from Laplace transform theory that there is a direct relationship between the impulse response and its transfer function; and in particular between their rates of decay (see e.g. Abramowitz & Stegun, "Handbook of mathematical functions", article 29.3.7)

$$\frac{\Gamma(k)}{s^k} \Leftrightarrow t^{k-1}$$

All these transfer functions are infinite at DC, so not particularly useful in practice. There are, however, more useful transform pairs that allow synthesis in either domain.

The type 1 signal shown in FIG. 3a is unipolar and it was found that a rate of approximately 2.25 to 2.5 gave the best feel/sound. Such a signal may be generated by using a cascaded first-order roll-off filter with unity gain pass-band. Filters of this type have the transfer function $$H(s) = \left(\frac{a}{s+a}\right)^p$$

For integer p, it is easy to see how this represents a cascade of p, first-order low-pass filters. Each filter has a cut-off frequency of $\omega c = a$ radians/sec. The roll-off rate is p-th order, i.e. 6p dB/octave. We wish to generalise this to the case when p is not an integer.

From a table of Laplace transforms, or a program that calculates them symbolically, we find (see e.g. Abramowitz & Stegun, "Handbook of mathematical functions", article 29.3.11)

$$t^{p-1}e^{-at} \Leftrightarrow \frac{\Gamma(p)}{(s+a)^p}, \text{ hence } h(t) = \frac{a^p}{\Gamma(p)}t^{p-1}e^{-at}$$

The impulse response is unipolar, and may be considered as a generalisation of the exponential decay.

The filter may be a classic first order filter with p=1. This should be familiar to anyone involved in simple systems design.

$$H(s) = \frac{a}{s+a}, h(t) = ae^{-at}$$

Alternatively, the filter may be a half-order filter with p=½. This filter would turn white noise into pink noise above the cut-off $$H(s) = \sqrt{\frac{a}{s+a}}, h(t) = \frac{1}{\Gamma(1/2)}\sqrt{\frac{a}{t}}e^{-at} = \sqrt{\frac{a}{\pi t}}e^{-at}$$

Notice the symmetrical nature of this pair—in both the time and the frequency domains, the power-law is the reciprocal square root. It is this symmetrical nature which is at the heart of the explanation of 1/f noise (it is a quantum-mechanical phenomenon).

The type 2 signal shown in FIG. 3a is bipolar and it was found that a rate of approximately 1.75 to 2.0 gave the best feel/sound. Such a signal may be generated by using a cascade second-order roll-off filter with unity gain pass-band. Filters of this type have the transfer function $$H(s) = \left(\frac{a^2 + b^2}{(s+a)^2 + b^2}\right)^p$$

For integer p, it is easy to see how this represents a cascade of p, second-order low-pass filters. Each filter has a cut-off frequency of ωc=sqrt($a^2+b^2$) radians/sec, and a Q of ωc/2a. The roll-off rate is 2p-th order, i.e. 12p dB/octave. Again, we wish to generalise this to the case when p is not an integer.

From a table of Laplace transforms, or a program that calculates them symbolically, we find (see e.g. Abramowitz & Stegun, "Handbook of mathematical functions", article 29.3.57 & 29.2.12)

$$(bt)^p e^{-at} J_p(bt) \Leftrightarrow 2^p \frac{\Gamma\left(p + \frac{1}{2}\right)}{b\sqrt{\pi}} \left(\frac{b^2}{(s+a)^2 + b^2}\right)^{p+\frac{1}{2}},$$

where $J_p$ is a Bessel function of order p.
hence $$h(t) = b\frac{\sqrt{2\pi}}{\Gamma(p)} \left(\frac{a^2+b^2}{2b^2}\right)^p (bt)^{p-\frac{1}{2}} e^{-at} J_{p-\frac{1}{2}}(bt)$$

The impulse response is bipolar, and may be considered as a generalisation of the damped sinusoid.

The filter may be a classic second-order filter with p=1. This classic filter transforms to the familiar damped sinusoid in the time domain.

$$H(s) = \frac{a^2 + b^2}{(s+a)^2 + b^2},$$

$$h(t) = b\sqrt{2\pi} \left(\frac{a^2+b^2}{2b^2}\right)^p (bt)^{\frac{1}{2}} e^{-at} J_{\frac{1}{2}}(bt) = \frac{a^2+b^2}{b} e^{-at} \sin(bt)$$

Alternatively, the filter may be first-order filter with a Q and p=½.

$$H(s) = \sqrt{\frac{a^2 + b^2}{(s+a)^2 + b^2}}, \quad h(t) = \sqrt{a^2 + b^2} \, e^{-at} J_0(bt)$$

The time-domain response is simply a damped, zeroth order Bessel function. For large t, the trigonometric approximation may be used (see e.g. Abramowitz & Stegun, "Handbook of mathematical functions", article 9.2.1), i.e.

$$h(t) \approx \sqrt{a^2 + b^2} \, e^{-at} \sqrt{\frac{2}{\pi bt}} \cos\left(bt - \frac{\pi}{4}\right)$$

which shows that this is essentially an amplitude modulated version of the ½-order filter of the half order filter described above.

Neither type 1 nor type 2 signals have the colouration in sound produced by a pencil. The type 6 signal was produced by convolving the type 1 signal with a similar signal of higher frequency. In this case the convolution has a closed form. The "Type 8" signal was produced by directly convolving the Type 2 signal with a similar signal of higher frequency, but lower Q.

The spectra (i.e. sound output against frequency) of the corresponding texture signals for a mean pulse rate of 72.6 Hz are shown in FIG. 3b. The modified spectra diverge from the original spectra from about 800 Hz, and the signals are noticeably quieter in "silent mode".

An alternative signal (type 3) may be generated using a filter having cascaded pairs of first-order sections with two, non-equal turning points. Filters of this type have the transfer function $$H(s) = \left(\frac{a}{s+a}\right)^p \left(\frac{b}{s+b}\right)^p$$

$$h(t) = \frac{a^p b^p}{\Gamma(p)} \sqrt{\pi} \left(\frac{t}{a-b}\right)^{p-\frac{1}{2}} e^{-\frac{a+b}{2}t} I_{p-\frac{1}{2}}\left(\frac{a-b}{2}t\right)$$

where $I_p$ is a modified Bessel function (see e.g. Abramowitz & Stegun, "Handbook of mathematical functions", article 29.3.50)

$$h(t) \approx \frac{a^p b^p}{\Gamma(p)} \left(\frac{t}{a-b}\right)^{p-\frac{1}{2}} \sqrt{\frac{2}{(a-b)t}} P\left((2p-1)^2, \frac{1}{8} \frac{2}{(a-b)t}\right) e^{-bt}$$

$$P(\mu, x) =$$
$$1 - (\mu - 1)x + (\mu - 1)(\mu - 9)x^2/2! - (\mu - 1)(\mu - 9)(\mu - 25)x^3/3! + \ldots$$

One example is a cascaded first-order filter with p=1, where $$h(t) = \frac{2ab}{a-b} e^{-\frac{a+b}{2}t} \sinh\left(\frac{a-b}{2}t\right) = \frac{ab}{a-b}(e^{-bt} - e^{-at})$$

As described above, the target pulse frequency of the PLL module is equal to drag velocity/inter-fibre spacing. This equation was derived by generating a simple 2-D model of the paper surface and pencil interaction to understand the fundamental process. Paper is typically manufactured using a "web" of cellulose fibres of 2-5 mm length and a fine clay coating (particles ~0.1 um). The resulting surface has ridges at many distance scales, but the major ones are in the range 0.1 mm to 0.5 mm, depending on the paper.

Pencils are typically manufactured from a soft-wood surround (Larch or Cedar) around a "lead". The lead is actually a ceramic formed as a co-fired mixture of graphite and clay, which is usually dipped in a polymer. The typical "sound" of a pencil is a function of the hardness of the lead and the beam resonances of the shaft. A typical series of modes might be, say; 350 Hz, 900 Hz, 2.0 kHz, 3.3 kHz, etc. The values will, of course, depend on the length of the pencil.

The mechanism, then, may be described as the stick-slip motion of the pencil over the rough paper surface, with the sound being modified by the resonances of the pencil.

FIG. 4 shows the simple 2-D model of the paper surface and pencil interaction in which the paper is modelled with semi-circular ridges of equal height spaced at a regular 0.15 mm pitch. The pencil tip, and a short section of the shaft are modelled explicitly, and the hand-arm system is modelled by lumped parameters.

The simulation occurs in two phases, each lasting 1 second. In the first phase, the pencil in lowered onto the paper surface, and a writing force on 1 N is applied. In the second phase, the pencil is dragged at 1 mm/s along the paper surface. The resulting forces on the hand and motions of the pencil tip may be seen in FIG. 5a and FIG. 5b respectively. The "cogging" seen in both sets of traces is in part due to the discrete nature of the model—the nodes. In real life, other texture details would be likely to cause similar effects.

It is plain to see that the periodicity of the signal is directly obtained from the drag rate and the inter-fibre spacing, i.e. the frequency=drag rate/inter-fibre spacing.

The precise wave shape is set by the degree of control applied to the pencil. In this simulation, the velocity at the hand is constant, and the tip follows appropriately. The opposite extreme would be to apply a constant force sufficient to overcome the average dynamic friction. In this case, the velocity would be non-uniform.

Figure 6A:
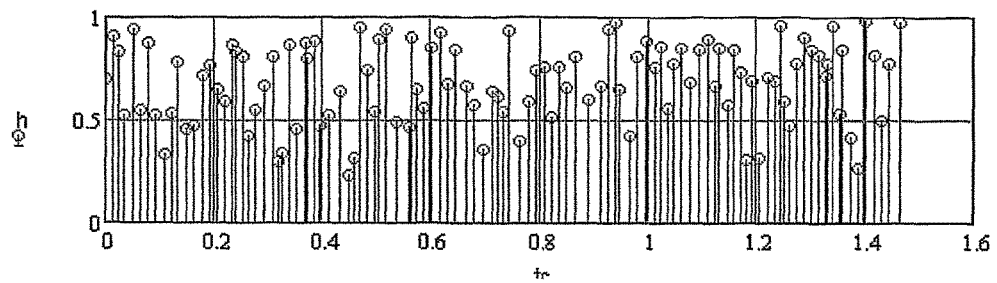
FIG. 6a plots the surface fibre distribution in time (tc) and amplitude (h) for a randomised surface structure.

FIG. 6a shows a more realistic model of the paper surface. Statistical distributions of fibre distances and heights have been used to generate the depicted randomised surface structure. The beta distribution was chosen to generate the model for two main reasons; it is bounded on [0,1] (unlike the boundless normal distribution), and with two independent parameters it is possible to control two of the main statistical parameters (the mean, the mode, and the variance). At this stage, the exact parameters of the statistical distributions are completely arbitrary.

Figure 5A:
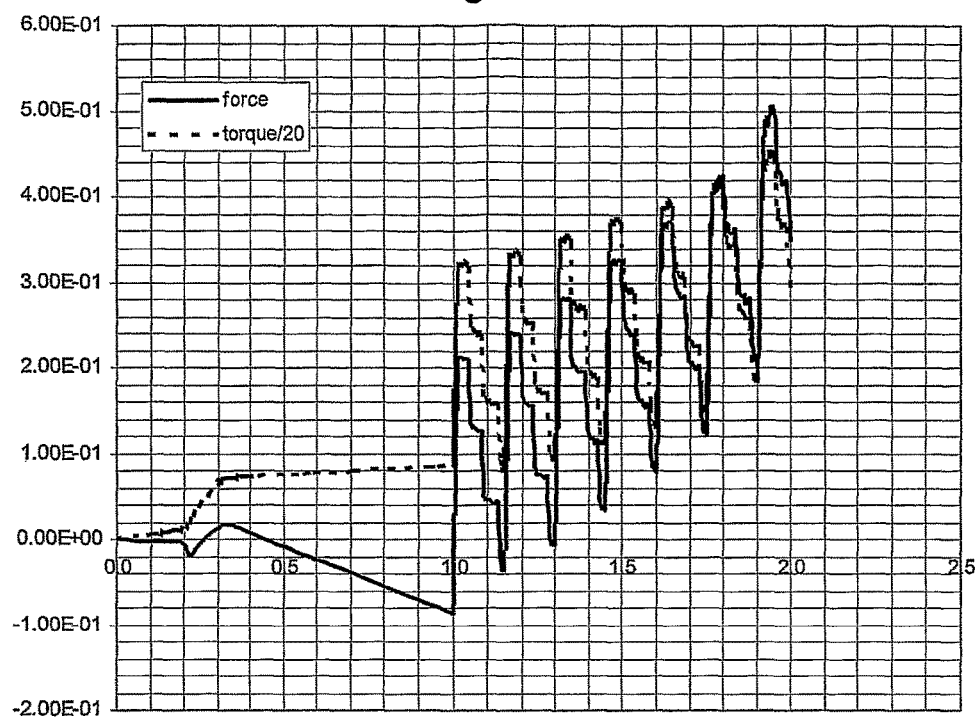
FIG. 5a shows the trace history of the reactions at a hand holding the pencil in FIG. 4 during FE simulation.
Figure 5B:
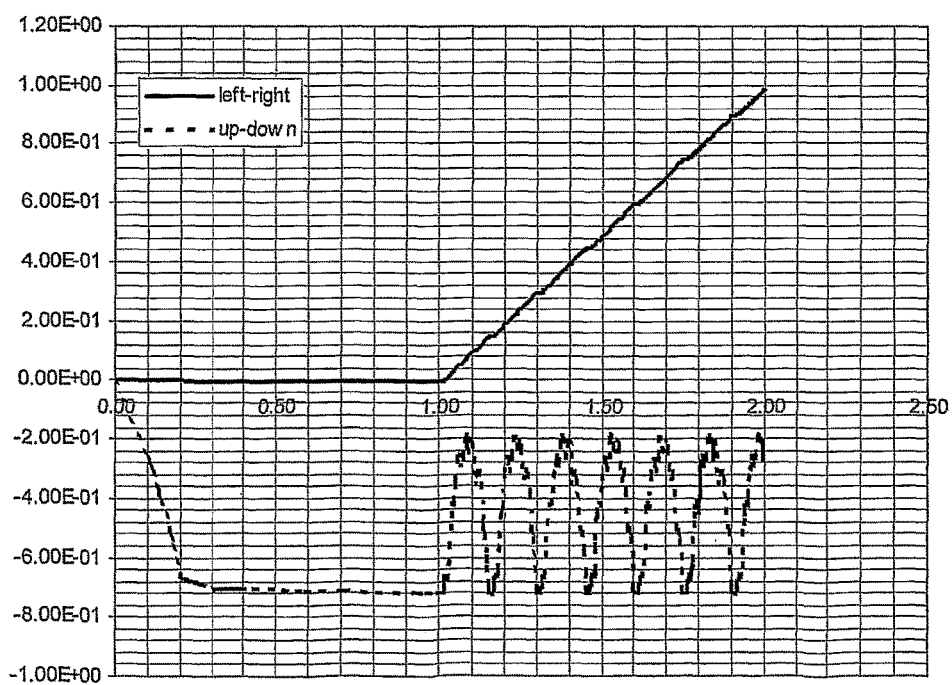
FIG. 5b shows the trace history of the pencil tip in FIG. 4 during FE simulation.

From the drag rate and the mean fibre separation, a cut-off frequency (fc) is calculated. A smoothed version of the spectrum generated by the model of FIG. 5a is seen in FIG. 5b, where fc is seen to feature strongly.

The sampling data is convolved with a leaky integrator. In the measurements, the time-constant corresponded to 40 rad/s, but this merely controls the amount of very low frequency information in the resulting signal. When the signal is played over the laptop loudspeaker, it sounds like a finger-nail being dragged over paper.

Figure 6B:
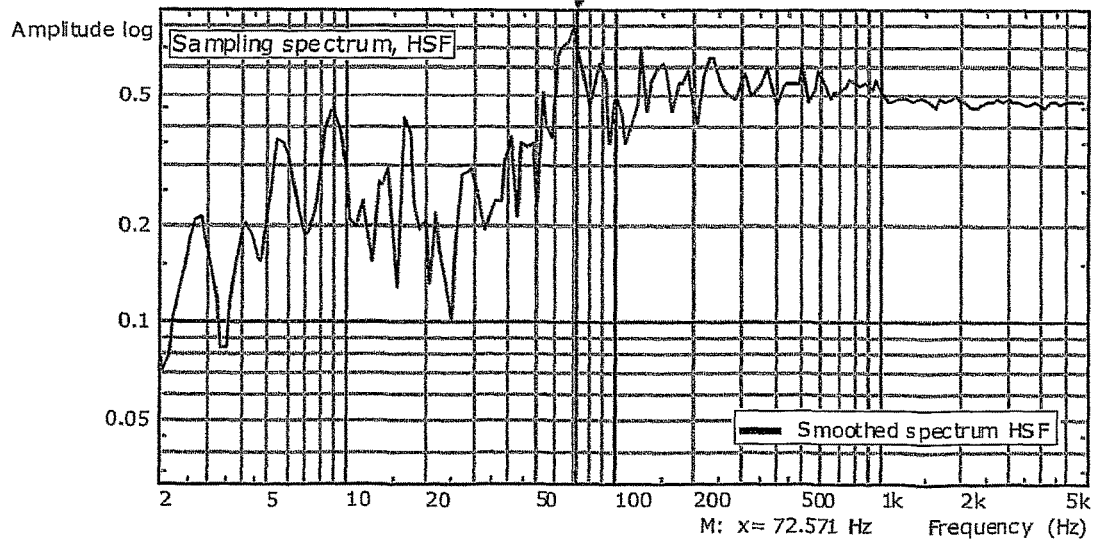
Figure 6C:
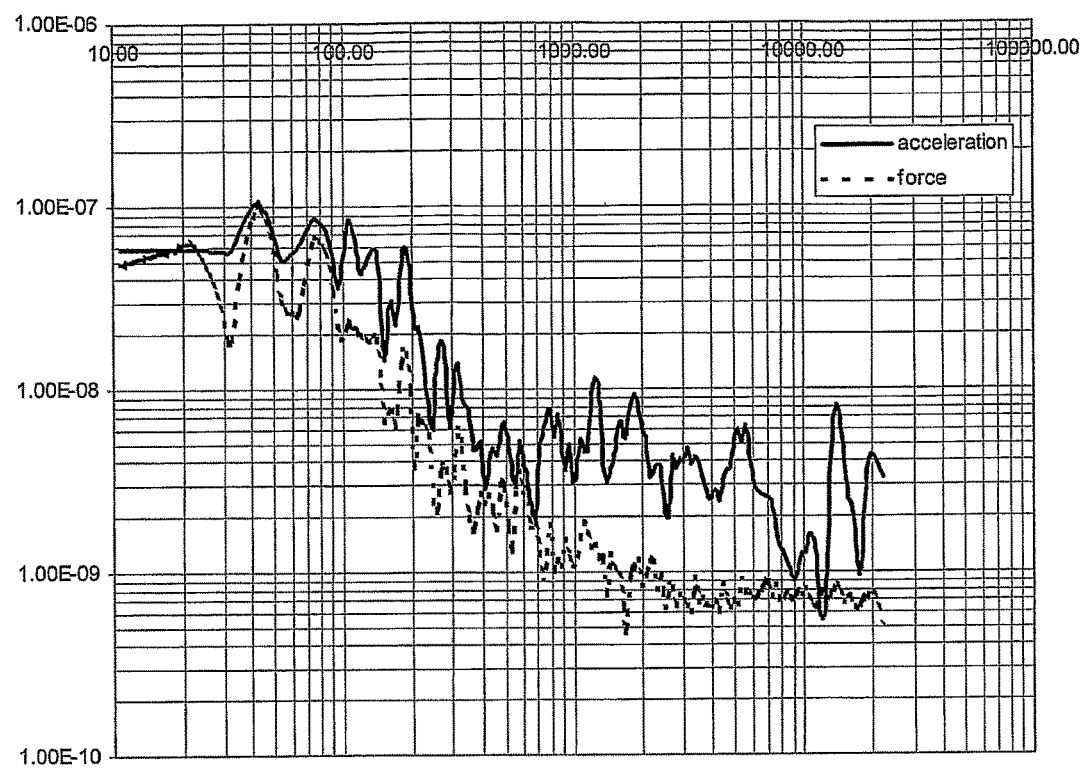
FIG. 6c shows the smoothed acceleration and force spectrum for the structure of FIG. 6a measured at 44.1 kHz.

FIG. 6c shows the force spectra for measurements obtained from a custom writing tool. The tool has interchangeable tips, and is fitted with a force gauge and an accelerometer, both connected to a charge amplifier (ENDEVCO Model 133). Neither gauges are fully calibrated, but the force gauge sensitivity is known to be close to 1 V/N. Data was acquired via a NI PCI-4452 data acquisition card. The spectrum of the measured signal is strongly affected by the speed of writing. The essentially low-pass spectra has cut-off frequencies that are directly proportional to the speed of writing. The bandwidth was roughly established by tracing over graph paper and using a stop watch to be about 50-60 Hz at 1 inch/sec writing rate for normal paper. The bandwidth was different for different surfaces.

In the example of FIG. 6c, the writing speed is about 2 in/s and the data is sampled at 44.1 kHz. The force results measure the forces applied between the pencil tip and the shaft of the writing tool. The acceleration results measure the resulting motion of the pencil. From these measurements, it is possible to derive the effective impedance of the system by using the relation $$Zm = F/v = j \cdot 2 \cdot \pi \cdot f \cdot F/a$$

where F=force, v=velocity, a=acceleration, f=frequency.

Bearing in mind that the accelerometer is uncalibrated, the effective impedance is like the combination of a 0.4 kg mass and a 100 Ns/m dashpot. This is, in effect, acting as a lossy integrator with a corner frequency of about 40 rad/s.

As is clearly seen, the measured force spectra of FIG. 6c corresponds to the simulated spectra of FIG. 6b. The signal of FIG. 6b is then filtered to apply boosts at frequencies corresponding to modes in a pencil. The new signal spectrum is reminiscent of the accelerometer spectra seen in FIG. 6c, which has some resonances in the acceleration trace due to modes in the writing tool. When the signal is played over the laptop loudspeaker, it sounds much more like a pencil being dragged over paper.

As shown in FIG. 2, if the sensor detects a touch, a "click" signal is requested. One such signal is a frequency and amplitude modulated cosine function, i.e.

$$h(t) = \alpha t e^{1-\alpha t} \cos\left(\frac{\omega c t}{1 + \beta t}\right)$$

h(t) is the product of g(t)– the envelope function and fm(t)– a frequency modulating function.
where $g(t) = \alpha \cdot t \cdot e^{1-\alpha \cdot t}$, which has a maximum value of unity at time $t = 1/\alpha$,
α is a decay rate of the envelope
β is a parameter controlling the rate of frequency modulation, and
ωc is the angular frequency at time t=0.

This signal may also be used as the "type 3" signal mentioned above which is used to generate handwriting texture when a drag is detected.

This cosine function signal was found to be more effective than its sine-based counterpart and further improvements are investigated below by adding a new variable φ was added to the function. This amended function is then optimally fitted to the target haptic spectrum.

$$h(t) = \alpha t e^{1-\alpha t} \cos\left(\frac{\omega c t}{1 + \beta t} - \phi\right)$$

It was observed that for the best signals, the peak of the envelope at $t=1/\alpha$ corresponds with a peak in the cosine function. In this case, we can set φ directly. Using elementary calculus confirms that the correct value sets the argument of the cosine to 0 at $t=1/\alpha$, thus:

$$h(t) = \alpha t e^{1-\alpha t} \cos\left(\frac{\omega c t}{1 + \beta t} - \frac{\omega c}{\alpha + \beta}\right)$$

as before h(t) is the product of g(t)– the envelope function and fm(t)– a frequency modulating function but in this case $$fm(t) = \cos\left(\frac{\omega ct}{1+\beta t} - \frac{\omega c}{\alpha + \beta}\right).$$

The optimal values for the three variables—α=532.5, β=83.85, ωc=3133—are slightly different from those of the original function. In both cases, the parameters are chosen to match a spectral template which shows the relative sensitivity of the finger-tips to vibration as a function of the vibration frequency. The aim is to put the most energy in the frequency range at which the fingers are most sensitive.

Figure 7A:
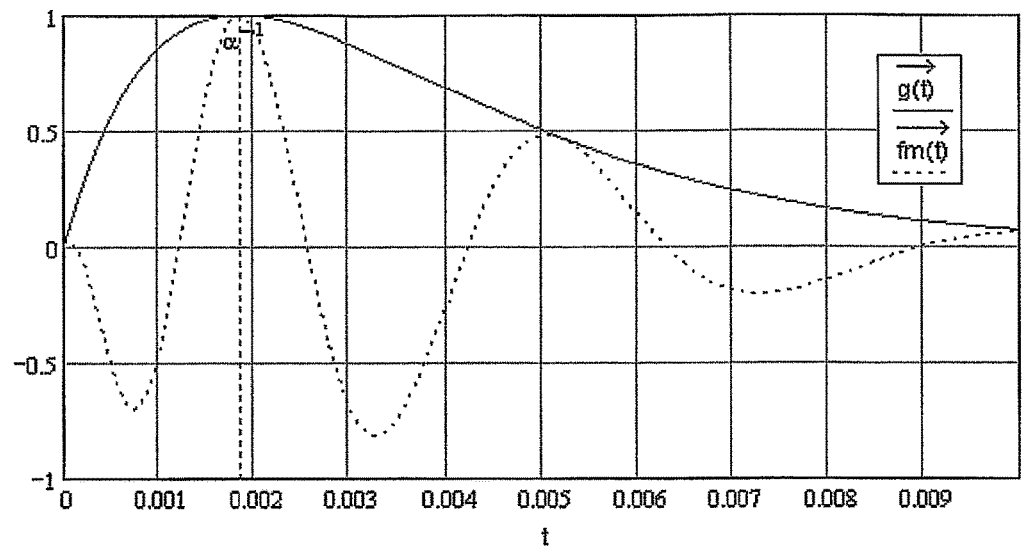
FIG. 7a plots the modified haptic click signal against time.
Figure 7B:
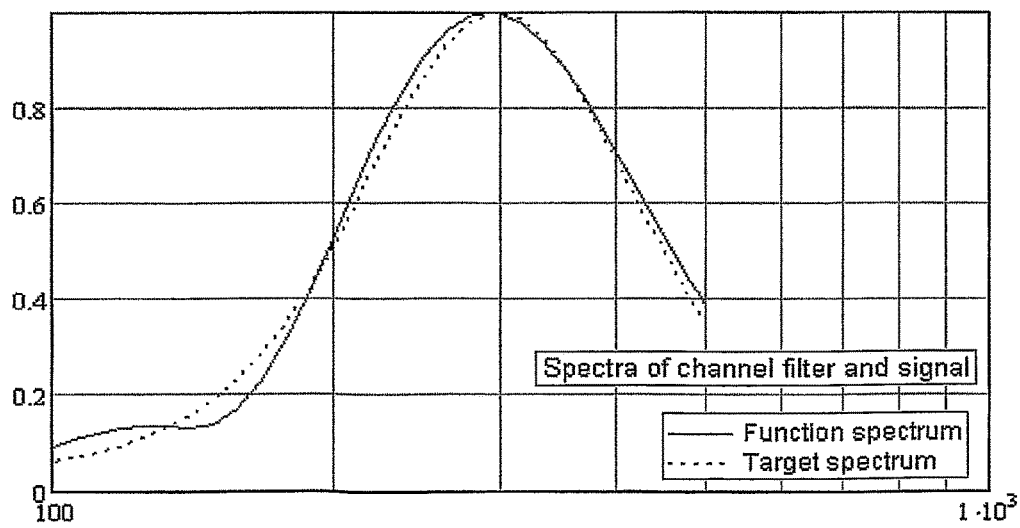
FIG. 7b plots the spectrum of the modified haptic signal of FIG. 7a and the target spectrum.

FIG. 7a shows the variation in time for the envelope function g(t) and the frequency modulation function fm(t) of the signal. FIG. 7a also shows how α is derived. The timing of the first non-zero point of intersection is equivalent to 1/α. FIG. 7b shows the target spectrum (dotted line) which gives the desired sensation to a user and the actual spectrum of the modified function detailed above. There is a good match between the two spectra. Other values of the parameters, or even other signals, may be used to achieve similar aims. The signal of FIGS. 8a and 8b is just such a signal—its parameter values are also chosen to match a target spectrum.

Figure 8A:
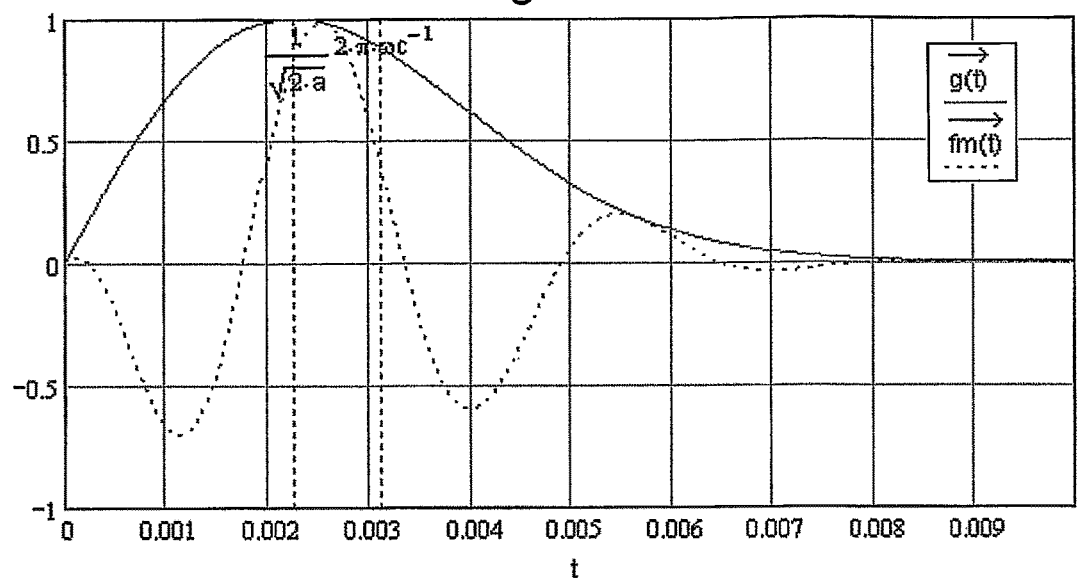
FIG. 8a plots an alternative modified haptic click signal against time.
Figure 8B:
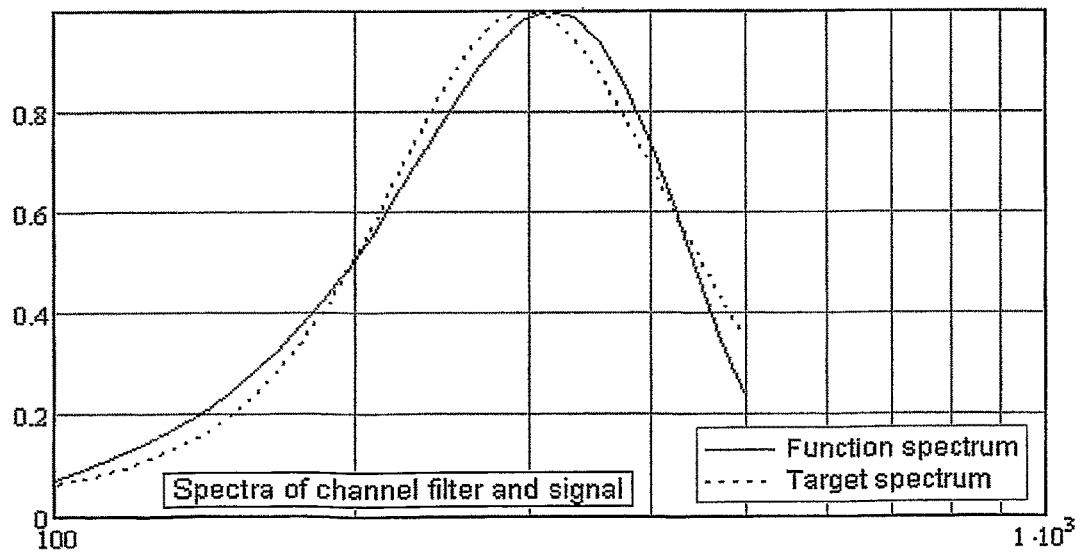
FIG. 8b plots the spectrum of the modified haptic signal of FIG. 8a and the target spectrum.

FIGS. 8a and 8b illustrate an alternative signal having its basis starting in the frequency domain and expressed as.

$$h(t) = \sqrt{2a} t \exp(0.5 - at^2) \cos(\omega ct - \phi)$$

Where a=96505=310.7², b=2011, φ=5.181 rad=297°.

FIG. 8a shows that the sensitivity curve (fm(t)) resembles a normal distribution curve. It is also known that this curve (fm(t)) is its own Fourier transform, so the time domain signal should be similar. FIG. 8a also shows how a and ωc are calculated. a and ωc are calculated as described above. As shown in FIG. 8b, this alternative does not provide as good a fit to the target spectrum as the signal of FIG. 7a but has the main advantage that the high-frequency end of its spectrum falls faster.

Comparing the two signals, for the same peak amplitude, the alternative signal appears to be 25% more energy efficient. However, some testing has shown that 15%-20% higher amplitude is needed to get the same sensation, thereby eliminating the advantage. There is less high-frequency energy in the alternative signal, which may well help with making it more silent. In short, there is not much to choose between them. The alternative signal is illustrated in FIGS. 8a and 8b as "type 9" signal.

Figure 9A:
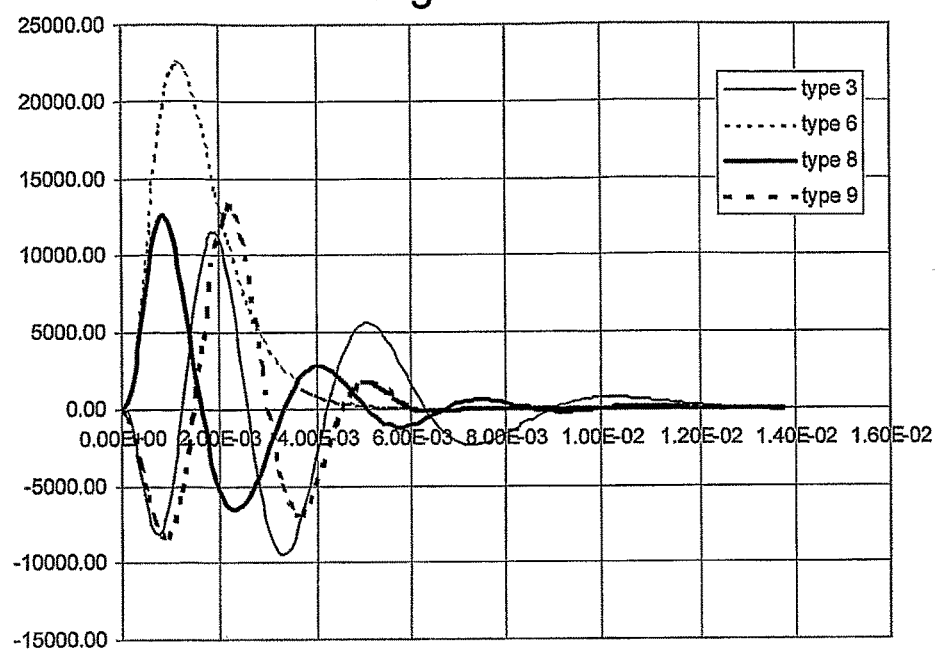
Figure 9B:
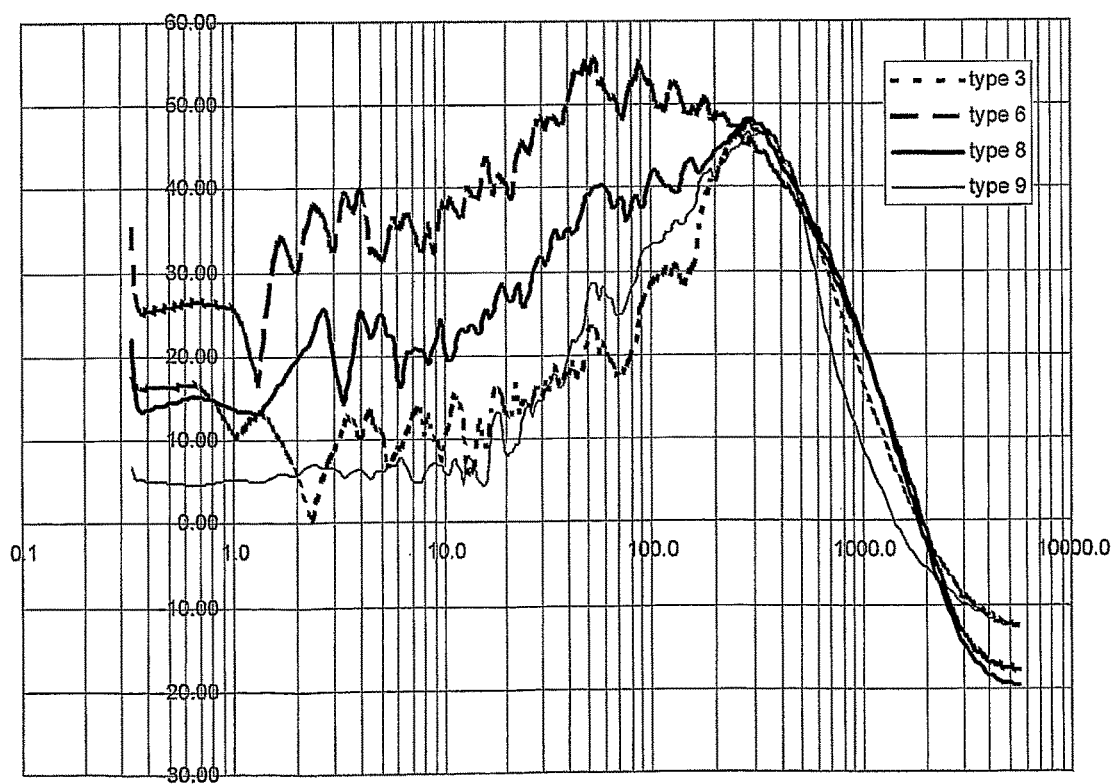

FIGS. 9a and 9b compare four signals for effectiveness as texture waveforms. The signals are adjusted in amplitude to give the same degree of sensation but use different amounts of power to achieve the sensation.

| Type | Description | Integrated rms level |
| --- | --- | --- |
| 3 | Original haptic click with phase optimisation of FIGS. 7a and 7b | 0.251 |
| 6 | Unipolar, dual slope generalised impulse, from type 1 - see FIG. 3a | 0.406 |
| 8 | Bipolar, dual slope generalised impulse, from type 2 - see FIG. 3a | 0.201 |
| 9 | Alternative haptic click of FIGS. 8a and 8b | 0.237 |

The type 8 signal is the most energy efficient, with the new haptic click (type 9) coming a close second. Type 6 is the least efficient.

The quicker decay of the type 9 signal, when compared to the otherwise similar type 3 signal, improves the feel considerably. Type 9 is the quietest in "silent mode" in the absence of additional filtering.

The small change to the existing type 3 click described in relation to FIGS. 7a and 7b is worth doing—it costs nothing, and makes an improvement. Whether or not it is worth changing to the alternative signal (type 9) will depend on subjective assessment.

The signal type currently suggested (type 8) is a minor adjustment to the type 2 signal previously chosen. It is still the most efficient, although not by much. It is worth comparing it to the new type 9 signal.

The invention claimed is:

1. A method comprising:
   sensing a movement of a hand held stylus over a touch screen;
   calculating a velocity of the movement of the stylus on the touch screen; and
   vibrating, in response to sensing, the touch screen with pulses using a vibration exciter coupled to the touch screen to produce a sensation for a user contacting the touch screen with the hand held stylus,
   wherein a duration between pulses is based on the calculated velocity and an inter-fibre spacing of a modeled paper surface to simulate a sensation of writing on the modeled paper surface to the user.

2. The method of claim 1, wherein the duration between pulses is further based on a random distribution with a mean at half of the duration between pulses.

3. The method of claim 2, wherein the distribution is bounded on [0,1].

4. The method of claim 3, wherein the distribution is a Beta, a rectangular, a Kumarswamy, or a triangular distribution.

5. The method of claim 1, wherein a pulse amplitude is based on a random distribution.

6. The method of claim 1, wherein simulating the sensation of writing further comprises producing a sound effect based on the duration between pulses.

7. The method of claim 1, wherein the inter-fibre spacing is between 0.1 mm and 0.5 mm.

8. The method of claim 1, wherein the vibration exciter is a piezoelectric bending transducer or a moving coil transducer.

9. A device comprising: a touch screen;
   a vibration exciter coupled to the touch screen; and
   a series of electronic modules configured to simulate a sensation of writing on a modeled paper surface to a user contacting a touchscreen with a hand held stylus, comprising:
   sensing a movement of the stylus over the touch screen;
   calculating a velocity of the movement of the stylus on the touch screen; and
   vibrating, in response to sensing, the touch screen with pulses using the vibration exciter coupled to the touch screen to produce a sensation for the user,
   wherein a duration between pulses is based on the calculated velocity and an inter-fibre spacing of the modeled paper surface.

10. The device of claim 9, wherein the duration between pulses is further based on a random distribution with a mean at half of the duration between pulses.

11. The device of claim 10, wherein the distribution is bounded on [0,1].

12. The device of claim 11, wherein the distribution is a Beta, a rectangular, a Kumarswamy, or a triangular distribution.

13. The device of claim 9, wherein a pulse amplitude is based on a random distribution.

14. The device of claim 9, wherein simulating the sensation of writing further comprises producing a sound effect based on the duration between pulses.

15. The device of claim 9, wherein the inter-fibre spacing is between 0.1 mm and 0.5 mm.

16. The device of claim 9, wherein the vibration exciter is a piezoelectric bending transducer or a moving coil transducer.

* * * * *